(12) United States Patent
Johnson

(10) Patent No.: US 7,457,535 B2
(45) Date of Patent: Nov. 25, 2008

(54) FLASH BRACKET

(76) Inventor: Joseph Johnson, P.O. Box 6531, Los Osos, CA (US) 93412

( * ) Notice: Subject to any disclaimer, the term of this patent is extended or adjusted under 35 U.S.C. 154(b) by 405 days.

(21) Appl. No.: 11/326,981

(22) Filed: Jan. 5, 2006

(65) Prior Publication Data

US 2006/0177216 A1    Aug. 10, 2006

Related U.S. Application Data

(60) Provisional application No. 60/642,177, filed on Jan. 7, 2005.

(51) Int. Cl.
G03B 15/03 (2006.01)
(52) U.S. Cl. .......... 396/155; 396/160; 396/190; 396/198; 396/422; 396/428; 248/181; 248/187.1
(58) Field of Classification Search .......... 396/155, 396/422, 419, 160, 190; 211/95; 248/187.1, 248/181
See application file for complete search history.

(56) References Cited

U.S. PATENT DOCUMENTS

| | | | |
|---|---|---|---|
| 1,282,177 A | 10/1918 | Blankenhorn | |
| 2,111,854 A | 3/1938 | Gasso et al. | |
| 2,782,700 A | 2/1957 | Ianuzzi | |
| 2,791,950 A | 5/1957 | Oppenheimer | |
| 2,824,504 A | 2/1958 | Bethmann | |
| 2,840,334 A | 6/1958 | Cauthen | |
| 3,183,810 A | 5/1965 | Campbell et al. | |
| 3,356,325 A | 12/1967 | Schnase | |
| 3,650,195 A * | 3/1972 | Jones | 396/422 |
| 3,677,509 A | 7/1972 | O'Connor | |
| 3,737,130 A * | 6/1973 | Shiraishi | 248/181.1 |
| 3,855,602 A | 12/1974 | Hoos | |
| 4,091,402 A * | 5/1978 | Siegel | 396/422 |
| 4,187,021 A | 2/1980 | Balser | |
| 4,255,036 A | 3/1981 | Pincetich | |
| 4,272,177 A * | 6/1981 | Ottenheimer | 396/423 |
| 4,291,967 A | 9/1981 | Jackson, Jr. | |
| 4,768,049 A | 8/1988 | Barrett et al. | |
| 4,886,230 A * | 12/1989 | Jones et al. | 248/170 |
| 4,929,973 A | 5/1990 | Nakatani | |
| 5,137,238 A * | 8/1992 | Hutten | 248/206.3 |
| 5,601,265 A | 2/1997 | Lopez | |
| 5,870,641 A | 2/1999 | Chrosziel | |
| 6,042,277 A * | 3/2000 | Errington | 396/419 |
| 6,196,504 B1 | 3/2001 | Lemke | |
| 6,354,544 B1 * | 3/2002 | Muzila | 248/187.1 |
| 6,435,738 B1 | 8/2002 | Vogt | |
| 6,641,323 B2 * | 11/2003 | Ronsheim | 403/90 |
| 6,663,299 B1 * | 12/2003 | Shupak | 396/422 |
| 6,685,148 B2 * | 2/2004 | Zadok | 248/187.1 |
| 6,701,081 B1 | 3/2004 | Dwyer et al. | |
| 6,773,172 B1 | 8/2004 | Johnson et al. | |
| 7,184,658 B2 * | 2/2007 | Squillace | 396/160 |

FOREIGN PATENT DOCUMENTS

JP    2000-97395    4/2000

* cited by examiner

*Primary Examiner*—W. B. Perkey
*Assistant Examiner*—Linda B Smith
(74) *Attorney, Agent, or Firm*—Chernoff, Vilhauer, McClung & Stenzel

(57) ABSTRACT

A bracket suitable for supporting a flash.

18 Claims, 4 Drawing Sheets

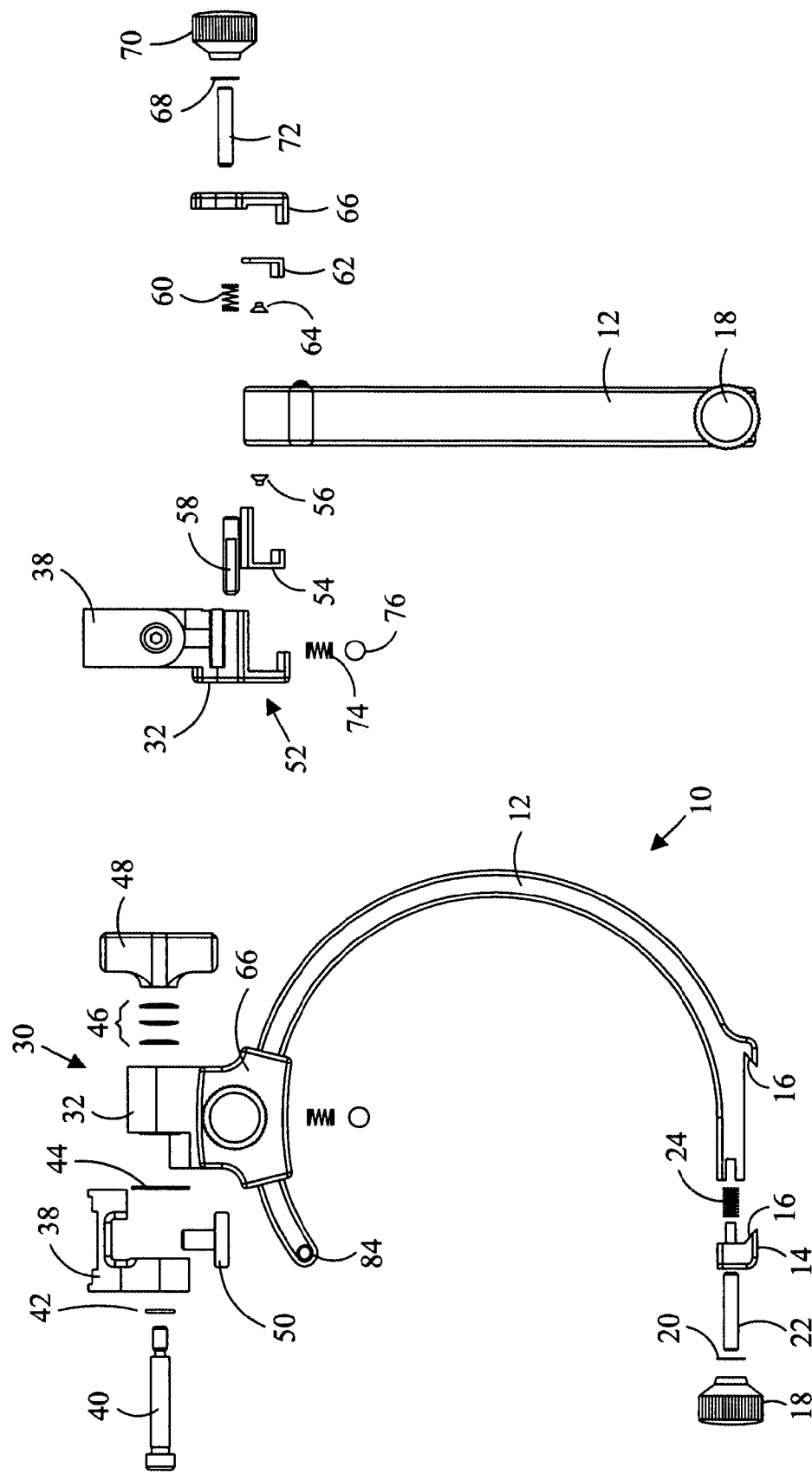

FLASH BRACKET

CROSS-REFERENCE TO RELATED APPLICATIONS

This application claims the benefit of U.S. Provisional App. No. 60/642,177, filed Jan. 7, 2005.

BACKGROUND OF THE INVENTION

The present invention relates to a bracket suitable for supporting a flash.

Photographers are always striving to take the perfect picture. In many cases, this involves the use of a flash to illuminate the subject. When a camera is held horizontally with a flash supported on top of the camera, flash based pictures tend to turn out as desired. However, when the same camera is held vertically with the flash extending out to the side while being supported by the top of the camera, flash based pictures tend to have an undesirable appearance.

U.S. Pat. No. 3,855,602 shows a camera bracket having a member with a base portion on which a camera can be detachably secured, and a second portion supporting a pivoting arm which, in turn, rotatably supports a member on which a flash attachment may be detachably connected.

U.S. Pat. No. 4,187,021 shows a camera attachment having an elongated base frame with vertical handles at each end and a camera attachment plate centrally located between the handles. A double parallelogram linkage consisting of a pair of inter-parallel links with the links connected to the upper end of one of the handles, a floating swing link, and an outer pair of pivotable links connected to a clamp ring provides support for a flash unit positioned in the clamp ring.

U.S. Pat. No. 4,255,036 shows a support for a camera and a photographic lamp which includes a vertical center section, a horizontal arm extending from the top of the center section to support the lamp, and a pivotal base that supports the camera beneath the lamp.

U.S. Pat. No. 4,291,967 shows an anatomically-shaped hand-grip assembly having a positive locking adjustment capability relative to a base plate to which a camera may be secured, and a positive locking adjustable flashshoe mounted on the top surface of the grip.

BRIEF DESCRIPTION OF THE SEVERAL VIEWS OF THE DRAWINGS

FIG. 1 illustrates a side view break-apart view of the flash bracket.

FIG. 2 illustrates an end view break-apart view of the flash bracket of FIG. 1.

DETAILED DESCRIPTION OF PREFERRED EMBODIMENT

Figure 4:
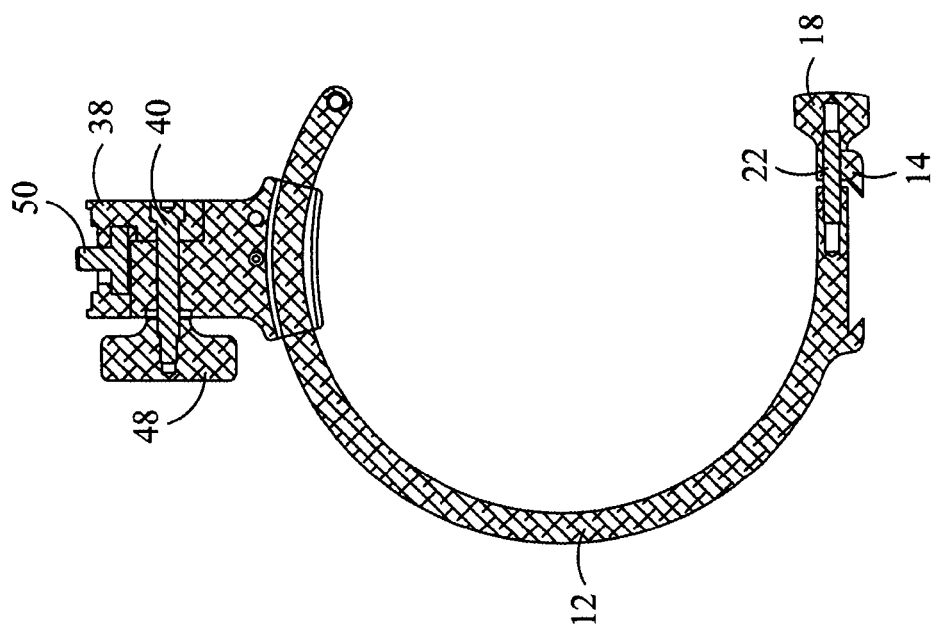
FIG. 4 illustrates a cutaway view along lines B-B of FIG. 3.
Figure 3:
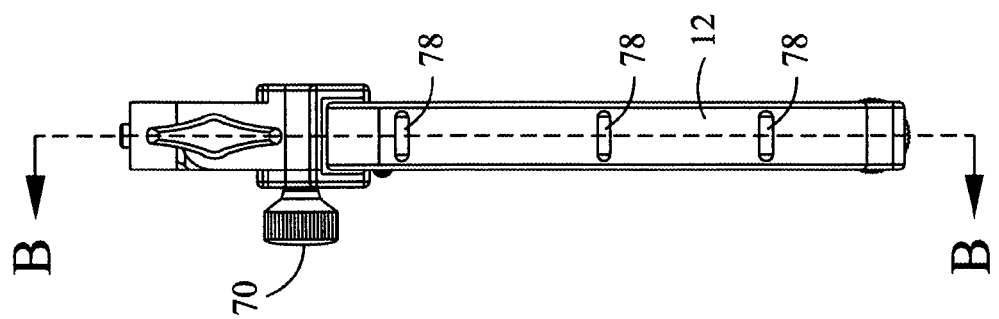
FIG. 3 illustrates an assembled end view of the flash bracket of FIG. 1
Figure 6:
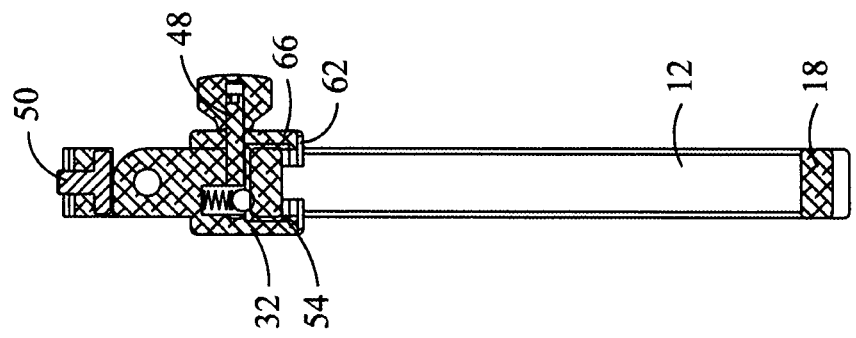
FIG. 6 illustrates a cutaway view along lines A-A of FIG. 5.
Figure 5:
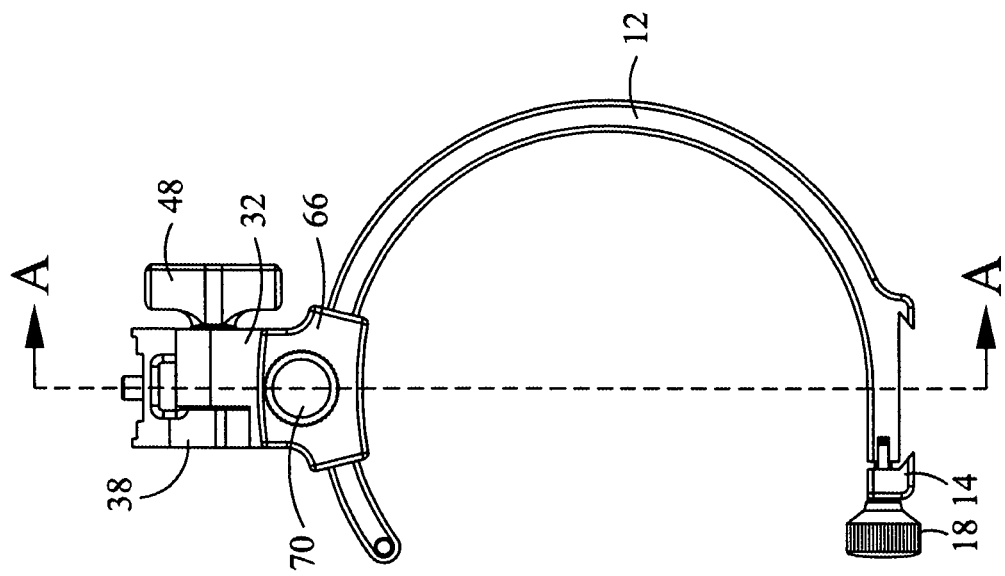
FIG. 5 illustrates an assembled side view of the flash bracket of FIG. 1.

In many cases, there is a need among photographers to change the orientation of the camera flash between a landscape orientation and a portrait orientation when taking pictures using a camera. Referring to FIGS. 1, 2, 3, 4, 5, and 6, a flash bracket 10 includes a curved flash arm 12. At one end of the flash arm 12 is included an arm clamp 14 that includes a pair of teeth 16 that secure the flash arm 12 to a ball head, a tripod collar of a lens, a bracket attached to the camera, or the camera itself. The clamp 14 is secured using a flash mount lock knob 18, a washer 20, a set screw 22, and a spring 24. The spring 24 acts to exert outward pressure against the knob 18 and/or the arm clamp 14 so that tension is maintained while tightening and loosening the arm clamp 14. In this manner, a quick release clamp may be included together with a flash arm 12. In addition, no tools, screwdrivers, or other instruments are necessary to secure the arm clamp 14 to a plate. It is to be understood that other clamping and securement mechanisms may likewise be used.

The flash arm 12 has preferably a curved profile over at least ½ of its profile, and preferably over more than 75% of its profile. Also, the flash arm 12 preferably has a curvature over at least 90 degrees, and more preferably over at least 180 degrees, so that a flash can be held in a vertical orientation while the camera is rotated 90 or more degrees.

A flash mount 30 is preferably slidably engaged with the flash arm 12. The flash mount 30 includes a flash mount body 32 to which is pivotally attached a flash mount tilt shoe 38 using a bolt 40, a washer 42, a washer 44, belleville washers 46, and a tilt shoe lock handle 48. The tilt shoe 38 may be positioned by loosening the handle 48, rotating the tilt shoe 38 into a suitable orientation, and tightening the handle 48. In this manner, the tilt shoe 38 preferably has a first orientation in line with the flash arm 12 directed straight up when the flash arm is in a vertical orientation, and a second orientation at substantially 90 degrees when the flash arm is in a vertical orientation.

A threaded tilt shoe thumb screw 50 may be provided within the tilt shoe 38 and extends out through an opening in the top of the tilt shoe 38. The flash (see FIG. 7) is mounted on the tilt shoe 38 and secured by screwing the thumb screw 50 into a threaded opening in the flash. In this manner, the flash is detachably engaged with the flash bracket 10. The flash mount body 32 includes a lower "L" shaped portion 52 within which is secured a sleeve 54 with a screw 56. The sleeve is preferably made from a plastic material so that it slidably engages with the curved flash arm 12. A dowel pin 58 is inserted within an opening in the flash mount body 32. A spring 60 engages over the dowel pin 58. A flash mount clamp bearing 62 is secured by a screw 64 to a flash mount clamp 66. A washer 68, a lock knob 70, and a threaded shaft 72 is engaged with a threaded opening in the flash mount body 32. This assembly secures the flash mount to the flash arm 12. In addition, the spring 60 acts to exert an outward pressure against the bearing 62 so that the clamp 66 does not freely move nor rattle when loosened.

The flash mount 30 is slidably engaged with the flash arm 12. By releasing the lock knob 70, the flash mount 30 may be slid along the flash arm 12, and secured in place by tightening the lock knob 70. The flash mount 30 may include an opening into which is inserted a spring 74 and an insert 76 which is depressible into the opening under pressure. In this manner, the insert 76 is in pressing engagement with the flash arm 12 (see FIG. 3). The flash arm 12 may include a series of detents 78 along the length of the flash arm 12. The insert 76 is extended when proximate one of the detents 78 and thus inhibits the continued sliding of the flash mount 30 along the length of the flash arm 12. The flash mount 30 may be slid further by a continued pressing on the flash mount 30. The flash mount 30 is inhibited from further movement along the flash arm 12 by a depressible spring biased pin 84. By depressing the pin 84, the flash mount 30 may slide past the pin 84 and become disengaged from the flash arm 12. In this manner, the flash mount 30 may be disengaged for cleaning, and also reversed in orientation so that the tilt shoe 38 tilts in the other direction.

Figure 9:
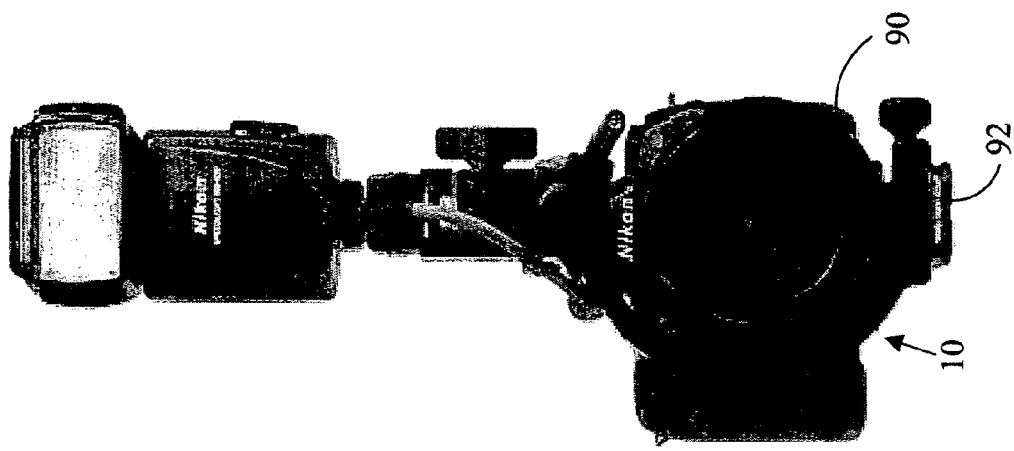
FIG. 9 illustrates the flash bracket, plate, and camera in a third position.
Figure 8:
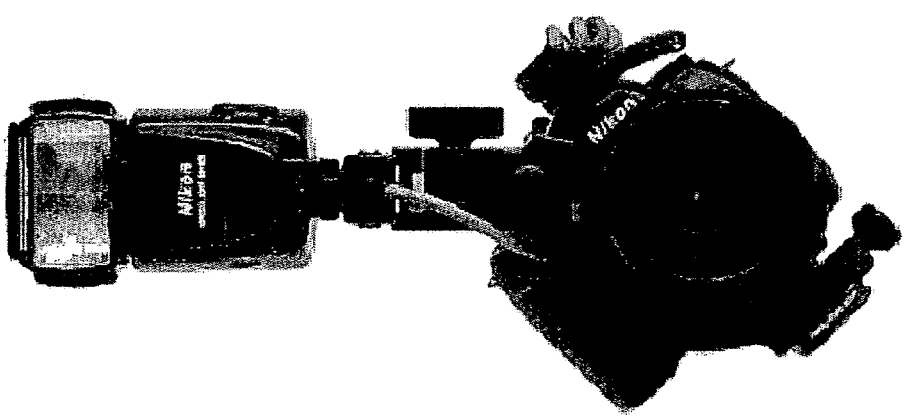
FIG. 8 illustrates the flash bracket, plate, and camera in a second position.
Figure 7:
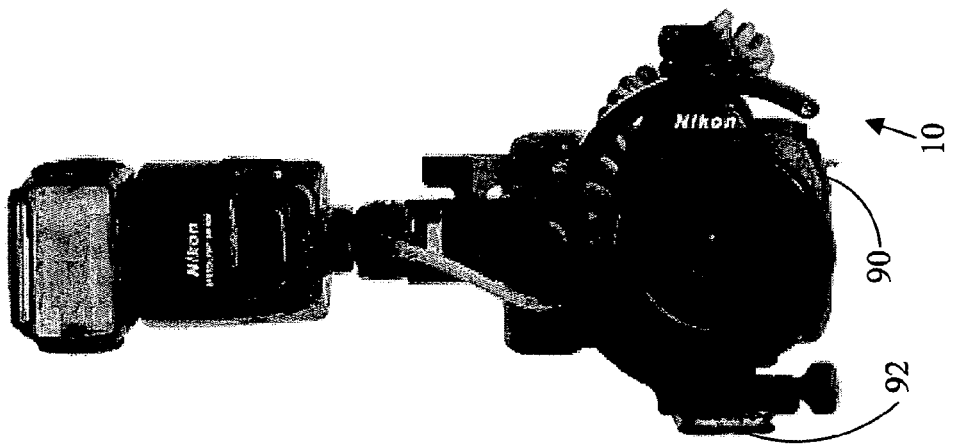
FIG. 7 illustrates a flash bracket, plate, and camera in a first position.

Referring to FIG. 7, the flash arm 10 may be connected to a camera body 90 (or a plate attached to the camera body 90) by a bar 92. It may be observed, that the horizontal camera has the flash position on the flash mount 30 above the camera body 90 in a desirable position for portrait photography. Referring to FIG. 8, the camera body 90 may be partially rotated and the flash mount 30 may be repositioned on the flash arm 12 to locate the flash in a desirable position for portrait photography, such as above the camera body 90. Referring to FIG. 9, the camera body 90 may be rotated to a vertical position and the flash mount 30 may be repositioned on the flash arm 12 to locate the flash in a desirable position for portrait photography, such as above the camera body 90.

As it may be observed, the flash bracket 10 may be connected to a camera or to lenses with tripod collars equipped with compatible plates. In addition, while the flash bracket 10 is not in use, it may be stored as a single item in a relatively flat orientation with the flash mount 30 attached or detached.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A bracket suitable for being attached to a camera and suitable for supporting a flash thereon comprising:
   (a) an arm comprising a first portion including a first end portion and a curved second portion including a second end portion spaced apart from said first end portion;
   (b) a first securement structure to detachably interconnect said arm with said camera; and
   (c) a second securement structure to detachably interconnect said arm with said flash, said second securement structure is slidably engaged with said second portion of said arm and movable on said arm from a first position where said flash projects substantially normal to an adjacent first side of said camera to a second position where said flash projects substantially normal to an adjacent second side of said camera, said first side of said camera arranged substantially normal to said second side of said camera.

2. The bracket of claim 1 wherein said first securement structure includes a pair of opposing teeth including a stationary tooth affixed to said arm and a movable tooth slidably attached to said arm.

3. The bracket of claim 2 wherein said teeth are supported by a ball head and said camera is supported by said ball head.

4. The bracket of claim 2 wherein said teeth are supported by a plate and said plate is supported by said camera.

5. The bracket of claim 2 wherein said teeth are in a first on-securing position, said teeth are moved to a second securing position, and said teeth are returned to said first non-securing position.

6. The bracket of claim 5 wherein said teeth are biased in said first non-securing position.

7. The bracket of claim 1 wherein said bracket has a curved profile over at least ½ of its profile.

8. The bracket of claim 7 wherein said bracket has a curved profile of at least 75 percent of its profile.

9. The bracket of claim 7 wherein said bracket preferably has a curvature over at least 90 degrees.

10. The bracket of claim 9 wherein said bracket preferably has a curvature over at least 180 degrees.

11. The bracket of claim 1 wherein wherein said first securement comprises:
    (a) a fixed tooth immovably affixed to said arm;
    (b) a movable tooth slidably affixed to said arm:
    (c) a knob in threaded engagement with said arm such that rotation of said knob in a first direction will move said moveable tooth toward said fixed tooth and rotation of said knob in an opposite direction will permit said moveable tooth to move away from said fixed tooth; and
    (d) a spring arranged to urge said movable tooth away from said fixed tooth.

12. The bracket of claim 1 wherein said second securement structure is pivotally attached to a flash mount.

13. The bracket of claim 12 wherein said flash mount is movable between a vertical orientation and a horizontal orientation at substantially 90 degrees from said vertical orientation.

14. The bracket of claim 12 wherein said flash mount is selectively adjustable to a plurality of different orientations.

15. The bracket of claim 14 wherein said flash mount includes a threaded screw that detachably secures said flash to said flash mount.

16. The bracket of claim 1 wherein said second securement structure has predefined positions along said bracket.

17. The bracket of claim 16 wherein said predefined positions are defined by respective positions that inhibits said second securement structure from freely sliding along said bracket.

18. A bracket suitable for attaching a flash to a camera, said bracket comprising:
    (a) an arm comprising a curved first portion including a first end portion and a second portion attached to said first portion and including a second end portion spaced apart from said first end portion;
    (b) a fixed tooth projecting from said second portion of said arm;
    (c) a movable tooth slidably attached to second portion of said arm and releasably restrainable to said arm to secure a mounting structure of said camera between said fixed tooth and said movable tooth; and
    (d) a flash securement structure detachably connectable to said flash and slidable on said first portion of said arm between a first position where said flash projects substantially normal to an adjacent first side of said camera and a second position where said flash projects substantially normal to an adjacent second of said camera, said second side of said camera arranged substantially normal to said first side of said camera, said securement structure restrainable to said arm at said first position and said second position and at a plurality of positions between said first and said second positions.

\* \* \* \* \*

UNITED STATES PATENT AND TRADEMARK OFFICE
CERTIFICATE OF CORRECTION

| | | |
|---|---|---|
| PATENT NO. | : 7,457,535 B2 | |
| APPLICATION NO. | : 11/326981 | |
| DATED | : November 25, 2008 | |
| INVENTOR(S) | : Joseph Johnson | |

It is certified that error appears in the above-identified patent and that said Letters Patent is hereby corrected as shown below:

Col. 4, Line 11

Change: "claim 1 wherein wherein" to read: --claim 1 wherein--.

Signed and Sealed this
Fourteenth Day of February, 2012

David J. Kappos
*Director of the United States Patent and Trademark Office*